Oct. 18, 1938.  H. A. SMITH  2,133,583
TOASTER ASSEMBLY
Filed Feb. 18, 1937
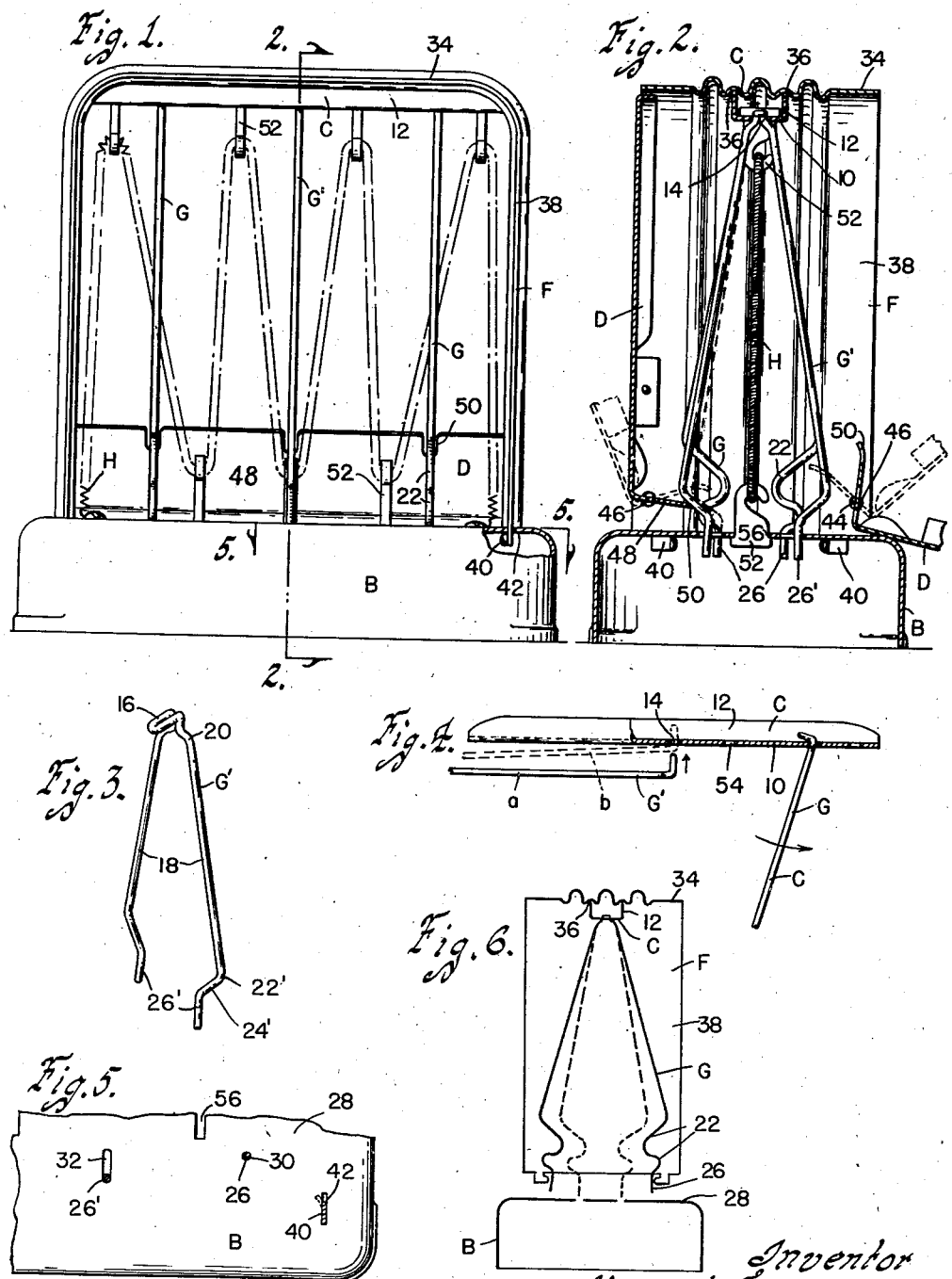
Witness
H. S. Nfunzenmain
Inventor
Howard A. Smith
By Bair, Freeman & Sinclair
Attorneys Patented Oct. 18, 1938

2,133,583

UNITED STATES PATENT OFFICE 2,133,583

TOASTER ASSEMBLY

Howard A. Smith, St. Louis, Mo., assignor to Knapp-Monarch Company, St. Louis, Mo., a corporation of Missouri Application February 18, 1937, Serial No. 126,454

15 Claims. (Cl. 219—19)

An object of my invention is to provide an assembly for a bread toaster or the like which is durable, inexpensive and comparatively simple.

A further object is to provide a toaster assembly including grid wires which are assembled in a facile manner and which after assembly serves to support a channel shaped member, which in turn supports (in conjunction with the base of the toaster) a heating element.

A further object is to provide grid wires which have arms and which are provided with heads arranged at an angle to the arms, the heads being projectable during assembly through openings of a frame element and by a swinging motion of the grid wires retained in such position when the base of the toaster is assembled, the base thereupon retaining the grid wires against reverse swinging to non-assembled position.

Still a further object is to provide a supporting bar for the heating element and grid wires which after assembly both support this bar and coact with the doors of the toaster to urge them to remain in their open or closed positions.

With these and other objects in view, my invention consists in the construction, arrangement and combination of the various parts of my toaster assembly, whereby the objects contemplated are attained, as hereinafter more fully set forth, pointed out in my claims, and illustrated in the accompanying drawing, in which:

Figure 1 is a side elevation of a toaster assembly embodying my invention and showing the near side door removed and the far side door open.

Figure 2 is a sectional view on the line 2—2 of Figure 1.

Figure 3 is a perspective view of one of the grid wires.

Figure 4 is a side view partly in section of a channel shaped member and the grid wires being assembled relative thereto.

Figure 5 is a sectional view on the line 5—5 of Figure 1; and

Figure 6 is a diagrammatical view showing the toaster parts being assembled relative to each other.

On the accompanying drawing I have used the reference character B to indicate a base. Spaced from the base I provide a channel shaped frame element C and coacting with this frame element and with the base I provide an enclosing frame element F.

The frame element C has a web 10 and a pair of flanges 12. The web 10 has three perforations 14 therein adapted to receive grid wires G and G'. Each of the grid wires G and G' comprises a length of wire bent at its central portion to form a pair of closely spaced parts constituting a head 16. Arms 18 extend from the head 16 at substantially right angles thereto. Adjacent the head, the arms 18 are provided with shoulders 20.

The grid wires G have double bends 22 adjacent their lower ends, beyond which shoulders 24 are provided and terminal ends 26. The grid wire G' in place of the parts 22, 24 and 26 has bends 22', shoulders 24' and terminal ends 26'.

The base B has a top wall 28 provided with four perforations 30 for the terminal ends 26 of the grid wires G and two slotted perforations 32 for the terminal ends 26' of the grid wire G'.

The enclosing frame element F has a top wall 34 provided with a pair of grooves 36 to receive the flanges 12 of the channel shaped member C. By way of illustration, these grooves are shown as being formed in the wall 34, the member F being made of sheet metal.

The frame member F is provided with end walls 38, each of which has a pair of tongues 40 on its lower end adapted to extend through slots 42 in the wall 28 of the base B and be thereafter bent or twisted as shown at the right lower corner of Figure 1, to retain the frame F assembled relative to the base B.

Doors D are provided for the sides of the toaster. Each of these has a pair of tongues 44 which extend through perforations 46 in the end walls 38, whereby the doors are pivoted relative to the toaster. Each door D has a flange 48 provided with three slots 50 for the lower ends of the arms of the grid wires G and G'. The bends 22 in the grid wires G permit the inner ends of these slots to clear these grid wires, but the bends 22' of the grid wire G' project out farther so that they do engage the inner ends of the slots, as will hereinafter appear.

A heating element H is provided which may be the usual form of coiler resistance wire. It is supported by insulators 52 which are projected through slots 54 and 56 of the frame element C and the base B respectively.

Assembly operations

During the assembly of the toaster, the grid wires G and G' are manipulated relative to the channel C to assume the positions indicated successively as $a$, $b$ and $c$ in Figure 4. The insulators 52 are then assembled relative to the channel C, whereupon the channel is associated with the grooves 36 of the frame F as shown in Figure 6. The frame is then placed on the base B, the grid wires G and G' being sprung from their full to their dotted position prior to entry thereof into the openings and slots 30 and 32 of the base. The grid wires normally assume the full line position of this figure as they are formed in this shape so that when they are contracted to their position for association with the base, it is desirable that they be under stress.

After the frame F is moved down to the position of Figure 2, the tongues 40 are bent or twisted to retain the parts in assembled relation. The shoulders 24 of the grid wires G and the bends 20 of these grid wires serve as a means to space the channel C from the base B and retain the flanges of the channel in the grooves 36 of the frame F without the necessity of any other fastening means. The bends 20 of the wire G' in conjunction with the head 16 thereof prevent any undesired up or down movement of this wire relative to the channel C.

In full lines at the right of Figure 2 the door D is shown in open position. As it is swung toward closed position, as shown by dotted lines, the inner end of the middle slot 50 of the flange engages the bend 22' of the grid wire G'. Thereafter, as shown by dotted lines at the left of Figure 2, the arm 18 of the grid wire is swung inwardly against the normal tendency for its terminal end 26' to remain at the end of the slot 32 closest the door. This dotted position illustrates its inward limit of movement during the swinging of the door to closed position. When the door is completely closed, the arm 18 springs slightly outwardly again as shown in full lines at the left of Figure 2, with the inner end of the slot 50 past the bend 22'. This retains the door in closed position until such time as it is desired to open it again.

The formation of the arms of the grid wire G', therefore, serves a useful purpose in cooperating with the door to hold it in closed position while the double bends 22 of the wires G serve to give to these wires a resiliency which biases the channel shaped member C upwardly to remain assembled in the grooves 36, against the strain of the heating element H tending to pull it downwardly.

Some changes may be made in the construction and arrangement of the various parts of the device without departing from the real spirit and purpose of my invention, and it is my intention to cover by my claims any modified forms of structure or use of mechanical equivalents which may be reasonably included within their scope.

I claim as my invention:

1. In a toaster assembly, a grid wire comprising a pair of arms in one plane, a head extending in a plane at an angle to the plane of said arms, a frame element having an opening to receive said head and a base having openings to receive the lower ends of said arms, said grid wire having integral shoulders adjacent said frame element and said base respectively, said frame element and said base being maintained in spaced apart relation by the interposition of said grid wire.

2. In a toaster assembly, a grid wire comprising a length of wire having at its center a head, the remaining portions of said wire constituting a pair of arms extending in a plane at an angle to the plane of said head, a frame wall having an opening to receive said head, means on said arms below said head to engage the wall opposite the head and a base having a pair of spaced openings to receive the lower ends of said arms, said arms adjacent their lower ends having shoulders engaging said base.

3. In a toaster assembly, a grid wire comprising a length of wire having at its center a head, the remaining portions of said wire constituting a pair of arms extending in a plane at an angle to the plane of said head, a frame wall having an opening to receive said head, means on said arms below said head to engage the wall opposite the head, a base having a pair of spaced openings to receive the terminal ends of said arms, said openings being slotted to permit movement of said terminal ends relative to said base and doors pivoted to said toaster assembly and having portions to engage said terminal ends and move them relative to the base during opening and closing movements of the doors, and another grid wire, a head and a pair of arms formed of said wire, said head being received in said frame wall, and the lower ends of said arms being received in spaced openings in said base, and having shoulders engaging said base.

4. In a toaster assembly, a grid wire comprising a length of wire having at its center a head, the remaining portions of said wire constituting a pair of arms extending in a plane at an angle to the plane of said head, a frame wall having an opening to receive said head, means on said arms below said head to engage the wall opposite the head, a base having a pair of spaced openings to receive the terminal ends of said arms, said openings being slotted to permit movement of said terminal ends relative to said base and doors pivoted to said toaster assembly and having portions to engage said terminal ends and move them relative to the base during opening and closing movements of the doors, said terminal ends being under stress to bias them toward the ends of the slots closest the doors, and another grid wire, a head and a pair of arms formed of said wire, said head being received in said frame wall, and the lower ends of said arms being received in spaced openings in said base, and having shoulders engaging said base.

5. In a toaster assembly, a grid wire having a head in one plane and a pair of arms in another plane at an angle relative to said one plane, a channel shaped frame element having an opening in the web thereof to receive said head, said arms diverging adjacent said head to engage said web opposite the head, a base having openings to receive the lower ends of said arms and an enclosing frame element connected with said base and having a wall spaced therefrom, said wall having a pair of grooves to receive the flanges of said channel shaped element.

6. In a toaster assembly, a grid wire having a head in one plane and a pair of arms in another plane at an angle relative to said first mentioned plane, a channel shaped frame element having an opening in the web thereof to receive said head, a base having openings to receive the lower ends of said arms and an enclosing frame element connected with said base and having a wall spaced therefrom, said wall having a pair of grooves to receive the flanges of said channel shaped element.

7. In a toaster assembly, a grid wire having a head in one plane and a pair of arms in another plane at an angle relative to said one plane, a channel shaped frame element having an opening in the web thereof to receive said head, a base having openings to receive the lower ends of said arms and an enclosing frame element connected with said base and having a wall spaced therefrom, said wall having a pair of grooves to receive the flanges of said channel shaped element, said arms adjacent their lower ends having shoulders engaging said base to retain the flanges of said channel shaped element assembled in said grooves.

8. In a toaster assembly, a plurality of grid wires, each having a head and a pair of arms at an angle relative to the head, a channel shaped frame element having openings in the web thereof to receive said heads, said arms diverging adjacent said heads to engage said web opposite the heads, a base having openings to receive the lower ends of said arms, some of said openings being slotted to permit movement of the arms therein relative to the base, doors pivoted to the toaster assembly and having portions engaging said last mentioned arms to move them relative to said slots during opening and closing movements of the doors and an enclosing frame element connected with said base and having a wall spaced therefrom, said wall having a pair of grooves to receive the flanges of said channel shaped element.

9. In a toaster assembly, a plurality of grid wires, each having a head and a pair of arms at an angle relative to the head, a channel shaped frame element having openings in the web thereof to receive said heads, said arms diverging adjacent said heads to engage said web opposite the heads, a base having openings to receive the lower ends of said arms, some of said openings being slotted to permit movement of the arms therein relative to the base, doors pivoted to the toaster assembly and having portions engaging said last mentioned arms to move them relative to said slots during opening and closing movements of the doors and an enclosing frame element connected with said base and having a wall spaced therefrom, said wall having a pair of grooves to receive the flanges of said channel shaped element, the rest of said arms adjacent their lower ends having shoulders engaging said base to retain the flanges of said channel shaped element assembled in said groove.

10. In a toaster assembly, a grid wire having a head in one plane and a pair of arms in another plane at an angle relative to said one plane, a channel shaped frame element having an opening in the web thereof to receive said head, a base having openings to receive the lower ends of said arms, an enclosing frame element connected with said base and having a wall spaced therefrom, said wall having a pair of grooves to receive the flanges of said channel shaped element, a heating element for said toaster assembly and supporting insulators therefor connected with said base and with said channel shaped element, said grid wires retaining said channel shaped element spaced from said base for supporting said heating element.

11. In a toaster assembly, a plurality of grid wires, each having a head and a pair of arms at an angle relative to the head, a channel shaped frame element having openings in the web thereof to receive said heads, said arms diverging adjacent said heads to engage said web opposite the heads, a base having openings to receive the lower ends of said arms, some of said openings being slotted to permit movement of the arms therein relative to the base, doors pivoted to the toaster assembly and having portions engaging said last mentioned arms to move them relative to said slots during opening and closing movements of the doors, an enclosing frame element connected with said base and having a wall spaced therefrom, said wall having a pair of grooves to receive the flanges of said channel shaped element, a heating element for said toaster assembly and insulators for supporting said heating element, said insulators being connected to said base and to said channel shaped element and said grid wires supporting the channel shaped element spaced from the base and the heating element thus in supported position.

12. In a toaster assembly, a plurality of grid wires, each having a head and a pair of arms at an angle relative to the head, a channel shaped frame element having openings in the web thereof to receive said heads, said arms diverging adjacent said heads to engage said web opposite the heads, a base having openings to receive the lower ends of said arms, some of said openings being slotted to permit movement of the arms therein relative to the base, doors pivoted to the toaster assembly and having portions engaging said last mentioned arms to move them relative to said slots during opening and closing movements of the doors, an enclosing frame element connected with said base and having a wall spaced therefrom, said wall having a pair of grooves to receive the flanges of said channel shaped element, the rest of said arms adjacent their lower ends having shoulders engaging said base to retain the flanges of said channel shaped element assembled in said groove, a heating element for said toaster assembly and insulators for supporting said heating element, said insulators being connected to said base and to said channel shaped element and said grid wires supporting the channel shaped element spaced from the base and the heating element thus in supported position.

13. In a toaster assembly, a grid wire, a head and a pair of arms on said wire, a channel-shaped frame element having an opening in the web thereof to receive said head, said arms diverging adjacent said head to engage said web opposite said head, a base having openings to receive the lower ends of said arms, sharply bent portions on the lower ends of said arms to engage said base and limit movement of said ends thereinto, an enclosing frame element connected with said base and having a wall spaced therefrom, a pair of grooves in said wall to receive the flanges of said channel-shaped element, said grid wire maintaining said base and said channel-shaped element in spaced apart relation and thereby preventing movement of the flanges of said channel-shaped element out of said groove, another grid wire having a head and a pair of arms, an opening in the web of said channel-shaped frame element to receive said head, said other grid wire being supported by said head against vertical downward movement when in assembled position, a pair of spaced openings in said base to receive the lower ends of said second mentioned arms, said openings being slotted to permit movement of said lower ends relative to said base, and doors pivoted to said toaster assembly and having portions to engage said lower ends and move them relative to the base during opening and closing movement of the doors, said lower ends being under stress to bias them towards the ends of the slots closest the doors.

14. In a toaster assembly, a grid wire, a head and a pair of arms on said wire, a channel-shaped frame element having an opening in the web thereof to receive said head, said arms diverging adjacent said head to engage said web opposite said head, a base having openings to receive the lower ends of said arms, sharply bent portions on the lower ends of said arms to engage said base and limit movement of said ends thereinto, an enclosing frame element connected with said base and having a wall spaced therefrom, a pair of grooves in said wall to receive the flanges of said channel-shaped element, said grid wire maintaining said base and said channel-shaped element in spaced apart relation and thereby preventing movement of the flanges of said channel-shaped element out of said groove, another grid wire having a head and a pair of arms, an opening in the web of said channel-shaped frame element to receive said head, said other grid wire being supported by said head against vertical downward movement when in assembled position, a pair of spaced openings in said base to receive the lower ends of said second mentioned arms, said openings being slotted to permit movement of said lower ends relative to said base.

15. In a toaster assembly, a grid wire, a head and a pair of arms on said wire, a channel-shaped frame element having an opening in the web thereof to receive said head, said arms diverging adjacent said head to engage said web opposite said head, a base having openings to receive the lower ends of said arms, sharply bent portions on the lower ends of said arms to engage said base and limit movement of said ends thereinto, an enclosing frame element connected with said base and having a wall spaced therefrom, a pair of grooves in said wall to receive the flanges of said channel-shaped element, said grid wire maintaining said base and said channel-shaped element in spaced apart relation and thereby preventing movement of the flanges of said channel-shaped element out of said groove, another grid wire having a head and a pair of arms, an opening in the web of said channel-shaped frame element to receive said head, said other grid wire being supported by said head against vertical downward movement when in assembled position.

HOWARD A. SMITH.